United States Patent [19]

Montana

[11] Patent Number: 4,557,297
[45] Date of Patent: Dec. 10, 1985

[54] FLUE GAS DUCT ASSEMBLY

[75] Inventor: Frank J. Montana, Western Springs, Ill.

[73] Assignee: Bisco Products, Inc., Park Ridge, Ill.

[21] Appl. No.: 596,059

[22] Filed: Apr. 2, 1984

Related U.S. Application Data

[62] Division of Ser. No. 472,635, Mar. 7, 1983, Pat. No. 4,467,863.

[51] Int. Cl.$^4$ .............................................. F16L 11/12
[52] U.S. Cl. .................................. 138/141; 138/137; 138/140; 138/149; 138/DIG. 6
[58] Field of Search ............... 138/137, 140, 141, 149, 138/172, DIG. 6, 113, 114; 165/136, 135, 81; 126/114, 118, 119; 285/47, 55, 114

[56] References Cited

U.S. PATENT DOCUMENTS

| | | |
|---|---|---|
| 2,039,781 | 5/1936 | De benedetti ....................... 138/121 |
| 2,209,547 | 7/1940 | Whitacre . |
| 2,272,138 | 2/1942 | Staniforth . |
| 2,329,719 | 9/1943 | Hewett . |
| 2,489,048 | 11/1949 | Rinehart . |
| 3,058,861 | 10/1962 | Rutter ................................. 138/121 |
| 3,095,014 | 6/1963 | Dosker . |
| 3,301,320 | 1/1967 | Huntington ......................... 165/136 |
| 3,317,074 | 5/1967 | Barker et al. ................... 138/149 X |
| 3,345,245 | 10/1967 | Hanusa ............................ 138/149 X |
| 3,396,079 | 8/1968 | Finzi .................................... 165/136 |
| 3,453,716 | 7/1969 | Cook ............................... 138/149 X |
| 3,561,492 | 2/1971 | Kauder et al. ....................... 138/121 |
| 3,698,440 | 10/1972 | Matthieu et al. .................... 138/149 |
| 3,768,523 | 10/1973 | Schroeder ........................... 138/149 |
| 3,770,557 | 11/1973 | Habeeb ............................... 165/136 |
| 3,818,948 | 6/1974 | Hedges . |
| 3,908,705 | 9/1975 | Botsolas ............................. 138/149 |
| 3,952,777 | 4/1976 | Uhlig ................................. 138/149 |
| 4,025,675 | 5/1977 | Jonda . |
| 4,063,344 | 12/1977 | Jones et al. . |
| 4,183,379 | 1/1980 | Marquette et al. . |
| 4,194,536 | 3/1980 | Stine .................................. 165/136 |
| 4,249,578 | 2/1981 | Freeman . |
| 4,275,771 | 6/1981 | Campbell, Jr. . |
| 4,280,536 | 7/1981 | Grant . |
| 4,287,245 | 9/1981 | Kikuchi . |
| 4,351,365 | 9/1982 | Bauermeister ...................... 138/149 |
| 4,351,366 | 9/1982 | Angioletti .......................... 138/149 |
| 4,400,863 | 8/1983 | Schroeder ....................... 138/121 X |

FOREIGN PATENT DOCUMENTS 750213  7/1980  U.S.S.R. .

OTHER PUBLICATIONS

Article entitled "Corrosion Stopper" on p. 45 of ENR, Dec. 17, 1981.
CEILCOTE, Technical Bulletin 5-20, Jul. 1979.
CEILCOTE, Technical Bulletin 5-14, Dec. 1980.
CEILCOTE, Technical Bulletin 5-5, Aug. 1980.
Sauereisen Acid-Alk Cement No. 33-Gunite Grade, Oct. 1981.
Sauereisen Acidproof Concrete No. 54, May 1982.
B. F. Goodrich Protective Linings for FGD Systems, IPD-82-TL-1.
CXL-2000 CARBOLINE, 314/644-1000, Aug. 1981.
Titanium Industries, "Titanium . . . the Solution to the Corrosion Problem in FGD Scrubber Systems".
Huntington Alloys, "We Take Corrosion Problems Out of Air Pollution Control," 80-365-1.
Technical Bulletin, Shell Chemical Company, SC:227-82, "EPON®" Resins for Fiberglass Reinforced Plastics, Jan. 1982.

Primary Examiner—James E. Bryant, III
Attorney, Agent, or Firm—Dressler, Goldsmith, Shore, Sutker & Milnamow, Ltd.

[57] ABSTRACT

A length of longitudinally extending duct assembly for heated corrosive gases includes an outer support duct and a substantially gas-tight liner. The liner is spaced from the outer support duct by a relatively yielding spacer material that accommodates expansion of the liner in directions parallel to the inner surface of the outer support duct and in directions normal to the inner surface of the outer support duct without imposing any substantial resistance to such thermal expansion.

6 Claims, 8 Drawing Figures

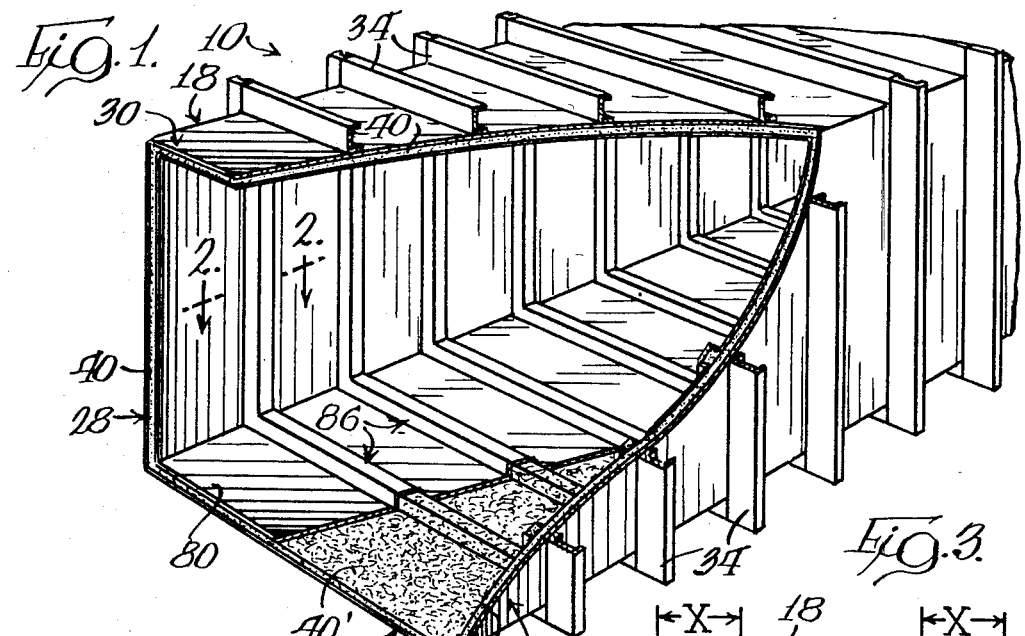
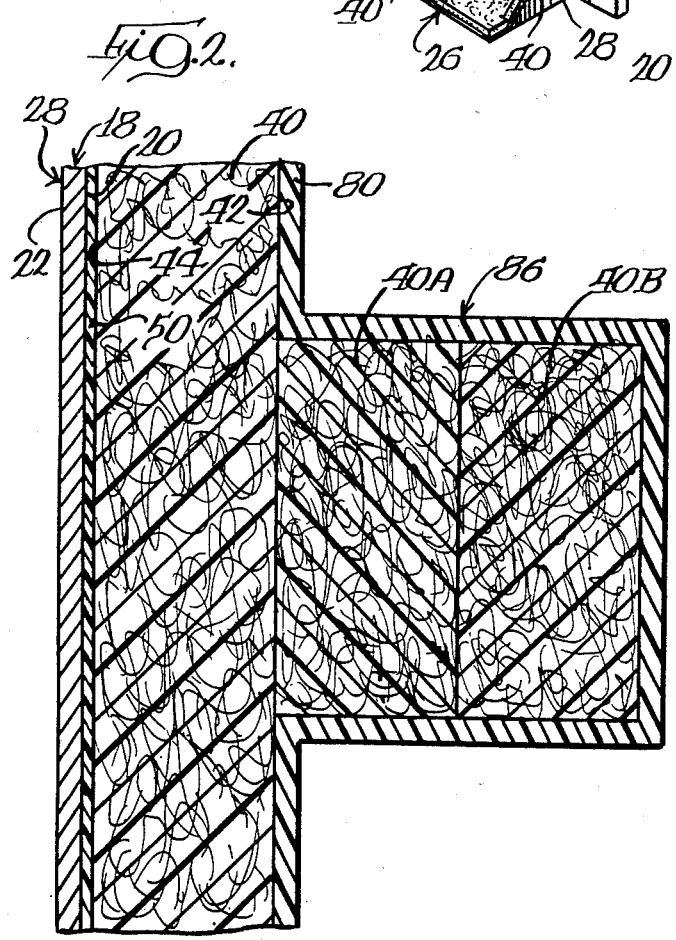
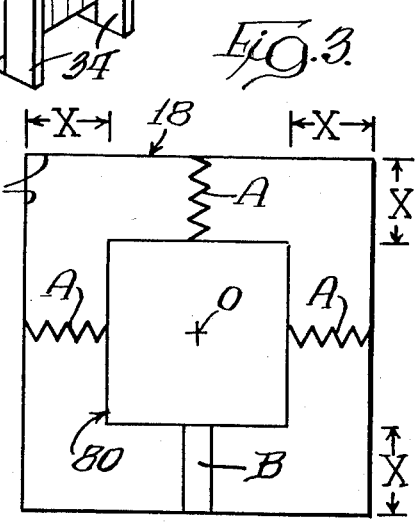
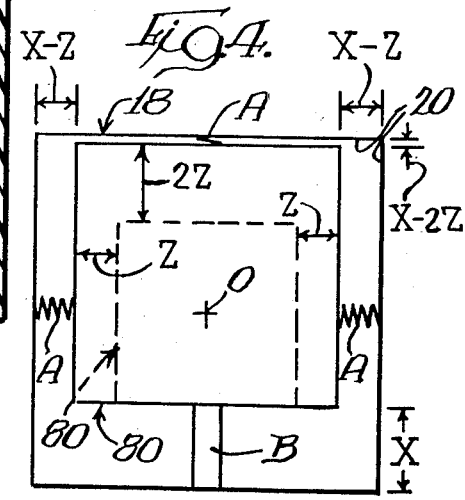

4,557,297

FLUE GAS DUCT ASSEMBLY

This is a division of application Ser. No. 472,635, filed Mar. 7, 1983 now U.S. Pat. No. 4,467,863.

TECHNICAL FIELD

This invention relates, in general, to a duct assembly for heated corrosive gases. The invention is particularly well suited for use as a liner structure inside a length of flue gas discharge ductwork of a fossil fuel electric power generating plant where such ductwork typically connects the boiler, scrubber, precipitator, reheater, and stack.

BACKGROUND OF THE INVENTION

Conventional Duct Assemblies

In many gas handling applications it is necessary to carry heated corrosive gases through suitable conduits. One type of large scale gas conduit system is found in fossil fuel electric power generating plants. The combustion process flue gases are carried between the boiler and the stack through large ductwork that frequently also connects a conventional scrubber, precipitator, and reheater between the boiler and the stack. The scrubber removes sulfur dioxide, the precipitator removes much of the small particulate matter, and the reheater increases the temperature of the flue gases which have become cooled by the scrubber.

Not all of the particulate matter is removed from the gas in all parts of the ductwork. Over a period of power plant operation, fly ash particulate matter settles out of the flue gas stream and coats the inside of the duct. The generally horizontal bottom portions of the ductwork may have to support the weight of tens of centimeters of such fly ash.

Reheating the flue gases with the reheater helps reduce the amount of corrosive condensate. The quantity of corrosive condensate produced decreases with increased temperature. The temperatures of the reheated flue gases may range between about 60° C. (140° F.) and about 82° C. (180° F.) or more.

Such flue gas ductwork is conventionally fabricated from steel plate that typically has a thickness of about 0.635 cm. (0.25 in.) or more. The ductwork is supported from the ground by suitable conventional structural steel support members. The outside of the ductwork may be insulated to reduce heat loss between the boiler and the stack and to thereby maintain the gas temperature as high as possible to reduce condensation in the system.

It is generally intended that fossil fuel electric power generating plants be operated, almost continuously, for 30 or 40 years. Depending upon actual operating conditions (including how often the scrubber, precipitator, and reheater are in or out of service), degradation of the steel ductwork is generally expected to occur. Such ductwork typically suffers acidic and halogen corrosion damage which may eventually create holes in the steel plate of the ductwork and which must be repaired.

Prior Art Liner Structures

Conventional methods of lining flue gas ductwork in electric power generating plants involve the application of a thin liner material directly to the interior of the steel duct. Such liner material may take the form of alternating layers of fire-retardant resin and fiberglass reinforcing. The liner material may also take the form of a rubber lining adhered to the duct surface. Other liners may take the form of polyester or epoxy coatings, as well as high grade metal alloys (e.g., titanium, nickel-base alloys sold under the trademark Hastelloy by Union Carbide Corp., United States of America, and alloys of nickel and chromium sold under the trademark Inconel by International Nickel Co., Inc., United States of America). All of these conventional liner materials are relatively thin, having a thickness of between about 0.127 cm. (50 mils) and about 0.254 cm (100 mils).

With the conventional thin liner materials, adequate surface preparation of the steel duct plate is necessary to ensure that the liner material is at least initially properly bonded to the steel duct plate. This typically requires the removal of the settled fly ash from the duct work, the patching of any holes in the steel duct plate, and the sandblasting of the inner surface of the steel duct plate Further, considerable care must be exercised when applying the liner material to the cleaned steel duct plate to ensure that a proper bond is obtained between the liner material and the inner surface of the steel duct plate. Since such liner materials are so thin, failure of the liner material to be properly bonded to the inner surface of the steel duct plate will cause that region of the liner to be susceptible to puncturing, tearing, and other damage.

Of course, if desired, steel duct plate may be provided with the above-described type of liner material during initial construction of the ductwork. However, even when the liner material is initially installed in new ductwork, it is critical to ensure that the inner surface of the steel duct plate has proper surface preparation and that the liner material is properly applied to the inner surface of the steel duct plate with great care to effect at least a good initial bond of the liner material to the steel duct plate.

Disadvantages of the Prior Art Liner Structures

Under typical field conditions, it is very difficult to ensure that the field craft workers and laborers will properly clean and prepare the inner surface of the steel duct plate for receiving the liner material. Further, under typical field conditions, it is difficult to ensure that the field craft workers will apply the liner material with the requisite degree of care necessary to effect a proper bond between the thin liner material and the inner surface of the steel duct plate.

Thus, it would be desirable to provide a duct liner, or a complete duct assembly with a liner, that would accommodate heated corrosive gases and that would eliminate the need for complex, careful, and expensive preparation of the duct inner surface.

Further, it would be desirable to provide a duct liner or duct assembly for heated corrosive gases that would not require the exercise of extreme care in applying a thin coating of liner material to the inner surface of an outer support duct to achieve a proper bond between the liner material and the duct inner surface.

Even if the duct plate surface is properly prepared, and even if the above-discussed liner materials are carefully applied to the duct plate surface to achieve at least an initial proper bond, it has been found in many instances that the integrity of the liner material is nevertheless eventually degraded or destroyed. This then permits the flue gases to contact and corrode the steel duct plate.

Postulated Failure Mechanisms of Prior Art Structures

The inventor of the present invention has inspected installations of corrosion resistant liner material in electric power generating plant flue gas ducts which have been operating for some period of time. He has observed damage to the liner material and to the steel duct plate. The liner material has, in places, flaked or peeled away from steel duct plate and the underlying duct plate has been subjected to the corrosive attack of the flue gases and acidic condensate.

The inventor has determined that the damage to the liner material occurs, at least to a significant extent, because the coating of liner material is applied and bonded directly to the steel duct plate. This type of construction is believed by the inventor to be highly susceptible to self-generated forms of degradation. The mechanisms by which this degradation occurs, as presently understood by the inventor, are explained in detail hereinafter. However, there is no intent herein to be bound by any theory or by any explanation so presented. It is sufficient to note that the inventor has now provided a novel duct assembly structure that is not susceptible to such degradation and damage. The new structure and its construction method are believed to be far superior to conventional duct lining systems and installation methods, respectively.

The conventional liner coatings, which consist of non-metalic materials, have thermal expansion coefficients that typically differ greatly from the thermal expansion coefficient of the duct material (e.g., the steel duct plate). For example, a reinforced polyester liner has a coefficient of thermal expansion which may be between 2 and 3 times as great as the steel duct plate coefficient of thermal expansion. Thus, at a given temperature, such a fiberglass liner material would expand or grow 2 to 3 times more than the steel duct plate. In addition, since the liner material is bonded to the inside of the steel duct plate and is directly in contact with the heated flue gases, the liner material can have a slightly higher temperature than the exterior steel duct plate. (With an exteriorly insulated steel duct having a very thin liner coating, this temperature difference may be measurable, as a practical matter, for only a brief period at start-up.)

In any case, even if the steel duct plate is assumed to be at the same elevated temperature as the fiberglass liner material, the liner material still expands 2 to 3 times more than the steel duct plate in all directions. This will tend to cause shearing and/or delamination of the liner material from the duct surface. The delamination may occur within the thickness of the liner material per se and/or at the interface bond between the liner material steel duct plate. This will tend to rupture, tear, or otherwise fracture or break apart the thin coating of liner material.

Once there is initiated a delamination, tear, rupture, or other stress induced discontinuity in the liner, such a discontinuity will tend to propagate and enlarge. Progressive flaking or rupturing of the thin coating of liner material then occurs.

When the thin coating of liner material has been breached, the corrosive flue gases and condensate attack the underlying steel duct plate. Corrosion of the steel duct plate, while destroying the steel duct plate per se, also undercuts and destroys the support for the surrounding coating of liner material thereby further weakening and/or destroying the liner material.

Even if the coefficient of thermal expansion of the liner material is *less* than the coefficient of thermal expansion of the outer duct, the differential expansion problem would still be present. For example, if the steel duct plate thermally expanded much more than the liner material, then the liner material would resist such greater thermal expansion. However, the relatively thin coating of liner material would necessarily be pulled and stretched by the expanding steel duct plate until the liner material fractured, ruptured, delaminated, etc., or until the bond between the steel duct plate and the liner material failed. Then the various problems associated with such a rupture or weakened coating of liner material would exist as discussed above.

In view of the above-described problems attendant with the use of a contact coating of liner material on a support duct having a different coefficient of thermal expansion, it would be desirable to provide an improved liner system, liner structure, or complete duct assembly for heated corrosive gases. Such an improved system, structure, or assembly should accommodate differential expansion of the materials employed in the ductwork construction without subjecting the materials to excessive stresses so as to avoid damage to the outer support duct and to any interior liner associated therewith.

The inventor believes that there are additional mechanisms which may contribute to the degradation or failure of the conventional thin coating of liner material. Specifically, in duct systems for heated corrosive gases, the thin coating of liner material is subjected to the elevated temperatures of the gases for long periods of time. Further, the duct system necessarily undergoes transient temperature changes when the duct system is shut down and then started up again. It is believed that constant thermal stress from elevated temperatures, as well as the transient thermal stress, adversely affect the thin coating of liner material and can ultimately lead to degradation and damage.

Finally, a thin liner coating directly bonded to the outer duct is subjected to suction forces or gas pressure differential forces as a result of the flue gases flowing through the ductwork. It is believed that these forces act to pull or peel the thin liner coating away from the outer duct.

In view of the above-discussed problems with a thin coating of liner material, it would be desirable to provide an improved liner system that is less susceptable to degradation from long term elevated temperatures and suction forces as well as from occasional transient temperature changes and transient suction forces.

SUMMARY OF THE INVENTION

A length of longitudinally extending inner structure is disposed inside a duct (which duct can then be regarded as an outer support duct) to provide a duct assembly for carrying heated corrosive gases.

A substantially gas-tight liner, substantially resistant to the corrosive gases, is disposed in the interior of the outer support duct. The liner defines a plurality of corrugations extending generally transversely of the liner at longitudinally spaced locations along the length of the liner for accommodating longitudinal thermal expansion of the liner by bellows-like elastic deformation.

A spacer material is disposed between the outer support duct and the liner. The spacer material is relatively yielding in directions generally parallel to the inner surface of the outer support duct under the application of relatively low shear forces resulting from relative thermal expansion movement between the liner and the outer support duct in directions parallel to the inner surface of the outer support duct. This minimizes the resistance to the relative parallel movement.

At least a portion of the spacer material that covers a portion of the interior transverse cross section perimeter of the outer support duct is also relatively yielding in directions generally normal to the inner surface of the outer support duct under the application of relatively low forces resulting from relative transverse thermal expansion movement between the liner and the outer support duct in directions normal to the inner surface of the outer support duct. This minimizes resistance to the relative transverse movement.

A novel method is provided for constructing the inner structure to form the duct assembly. According to a preferred form of the method, the spacer material is first placed against the inner surface of the outer duct. The liner is then placed against the inner surface of the spacer material. The liner corrugations may be preformed or the corrugations may be molded in situ around forming ribs adjacent the spacer material.

Numerous other advantages and features of the present invention will become readily apparent from the following detailed description of the invention and embodiments thereof, from the claims, and from the accompanying drawings.

BRIEF DESCRIPTION OF THE DRAWINGS

In the accompanying drawings forming part of the specification, and in which like numerals are employed to designate like parts throughout the same, FIG. 1 is a fragmentary, perspective view of a length of a longitudinally extending duct assembly for heated corrosive gases with a first embodiment of an inner structure constructed in accordance with the present invention with portions of the assembly broken away to better illustrate interior detail;

FIG. 2 is a greatly enlarged, fragmentary, cross-sectional view taken generally along the plane 2—2 in FIG. 1;

FIG. 3 is a simplified, schematic diagram of the duct assembly of FIG. 1 illustrating the assembly in a "cold" condition;

FIG. 4 is a simplified schematic diagram similar to FIG. 3 but showing the duct assembly in a "hot" operating condition carrying heated gases;

DESCRIPTION OF THE PREFERRED EMBODIMENTS

Figure 5:
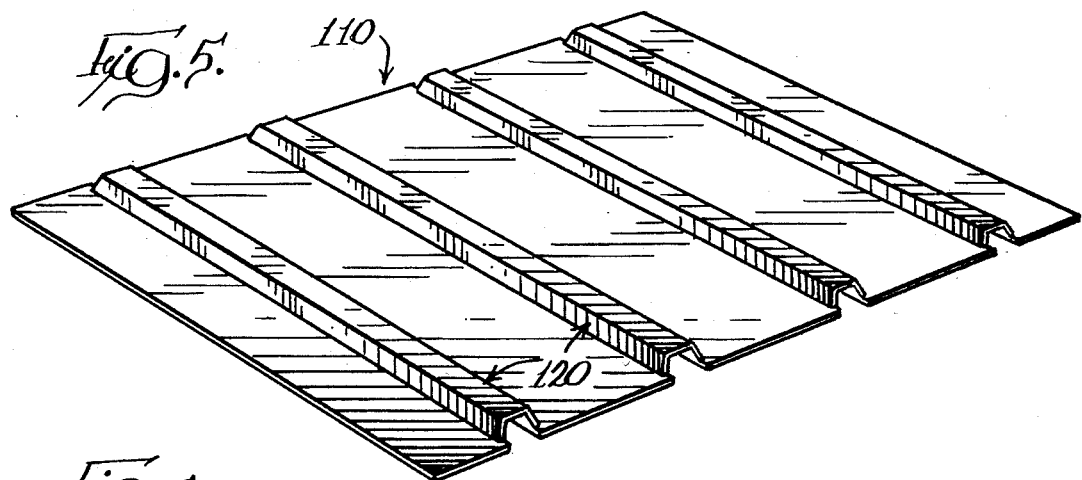
FIG. 5 is a perspective view of a panel for forming part of a second embodiment of an inner structure of the duct assembly.

The duct assembly provided by this invention may be supported by conventional structural supports and may be insulated on its exterior by conventional insulation. The details of such support structures and insulation, although not illustrated or fully described, will be apparent to those having skill in the art and an understanding of the necessary functions of such features.

First Embodiment

A length of longitudinally extending duct assembly for heated corrosive gases is illustrated in FIG. 1 and designated generally therein by reference numeral 10. The length of duct assembly 10 may be part of a longer duct supported by suitable structural support members (not illustrated).

The duct assembly 10 is particularly well suited for use as a fossil fuel electric power generating plant flue gas discharge duct between the boiler and the stack, and especially between the scrubber (if any) or other equipment and the stack. The duct assembly 10 will be described in such an application. However, it is to be understood that the duct assembly may function in other gas handling applications.

Although the duct assembly 10 may have any suitable cross-sectional shape, large flue gas discharge ducts typically have a rectangular tranverse cross section as illustrated in FIG. 1 with a height and width of about 2 meters or more and about 6 meters or more, respectively.

The duct assembly 10 includes an outer support duct 18 which is typically fabricated from steel plate, having a thickness of about 6.35 mm. (0.25 in.) or more, presenting an inner surface 20 and an outer surface 22. In the particular length of duct assembly illustrated in FIGS. 1–4, the outer support duct 18 has a generally horizontal bottom wall 26, two opposed and generally vertical side walls 28, and a generally horizontal top wall 30.

The outer support duct 18 preferably includes exterior, transverse, rigidifying stiffeners 34. These stiffeners 34 may be in the form of structural steel channels welded to the exterior of the outer support duct 18. The transverse cross section shape of the outer support duct 18 may vary along the length of the assembly 10 as necessary to connect to the equipment (e.g., the scrubber, the precipitator, and the reheater) and to the stack. The outer support duct 18 may include appropriate transition sections enlarging or decreasing the cross-sectional size and may include lateral and vertical changes in direction as are necessary to connect the stack and to the various pieces of equipment. For ease of illustration in FIG. 1 and to best illustrate the principles of the present invention, such complex configurations have not been shown.

The duct assembly 10 includes an inner structure comprising additional components or materials disposed within the interior of the outer support duct 18 in a unique manner according to the teachings of the present invention. Advantageously, the outer support duct inner surface 20 need not be extensively prepared or treated to receive the inner structure components which include an adhesive 50, a spacer material 40, and a liner 80.

If the entire assembly 10 (including the inner structure components) is being initially constructed at one time, and if the outer support duct 18 is conventional steel duct plate, then the plate primer coating (that is typically on such steel duct plate when delivered to the field) may be left on the plate. On the other hand, if an existing duct 18 is being modified with the additional materials to form the improved assembly 10 in accordance with the teachings of the present invention, then the existing duct 18 is merely cleaned to remove any interior debris and particulate matter from the inner surface of the duct. Sandblasting, chemical cleaning, or patching up of relatively small holes or cracks is not required.

The spacer material 40 is placed on the inside of the outer duct 18 and substantially covers the inner surface 20. The spacer material 40 has an inner surface 42 (FIG. 2) and an outer surface 44 (FIG. 2) which faces against, and is secured to, the outer support duct inner surface 20 by the adhesive 50.

The spacer material 40 may consist of panels of conventional 5 cm. (about 2 in.) thick duct insulation board, such as that sold in the United States of America by CertainTeed Corporation, P.O. Box 860, Valley Forge, Pa. 19482 U.S.A., under the trademark CertainTeed with the additional designation "FiberGlass Insulation Board IB 300 2" Plain." Such duct insulation board has a relatively low density and is easily compressible in any direction.

The spacer material 40, if it is conventional duct insulation board, may be conveniently secured to the inner surface 20 of the outer support duct 18 with the adhesive 50 which may be of the pressure-sensitive type such as that sold in the United States of America under the trademark designation (CP-85) CHIL-STIX CLEAR by Childer Products Company, Beachwood, Ohio 44122 U.S.A. When a pressure-sensitive adhesive 50 is used to secure the spacer material 40 to the outer support duct 18, the inner surface 20 of the outer support duct 18 need be only clean enough to be capable of accepting about a 0.32 cm. (0.25 in.) thick layer of such a pressure-sensitive adhesive and of permitting proper formation of the adhesive bond.

For reasons explained in detail hereinafter, the bottom of the duct assembly 10 (i.e., the bottom wall 26) may be covered with a spacer material 40' that is substantially less yielding or less compressible in the direction normal to the outer support duct inner surface 20 than is the spacer material 40 covering the outer support duct vertical side walls 28 and top wall 30. The spacer material 40' need not necessarily be adhesively (or otherwise) secured to the outer support duct bottom wall 26 since the wall 26 is substantially horizontal.

In any case, once the interior of the outer support duct 18 is substantially covered with the spacer material 40 (or 40 in combination with 40'), the liner 80 is fabricated on the interior of the outer support duct 18 so that it is substantially gas-tight. The liner 80 is spaced from the outer support duct 18 by the spacer material 40 (or 40 and 40') and is substantially resistant to the corrosive gases. The liner is otherwise in general conformity with the transverse configuration of the outer support duct 18.

One preferred form of the liner 80 comprises a fiberglass reinforced polyester material that is fabricated to a thickness of the between about 5 mm. and about 8 mm. by means of a conventional spray-up process so as to bond the liner 80 to the inner surface 42 of the spacer material 40. Alternatively, a fiberglass reinforced liner may be fabricated by conventional hand lay-up methods using alternating layers of resin and fiberglass cloth to build up a thickness of between about 5 mm. and about 8 mm. with three, four, or five plies of fiberglass cloth.

Since the duct assembly 10 is fabricated at typical ambient atmospheric temperatures, and since the duct assembly 10 must carry the gases at elevated temperatures, the inventor has provided a novel structure within the liner 80 for accommodating the longitudinal thermal expansion. Specifically, the liner 80 defines a plurality of corrugations or corrugations means 86 extending generally transversely of the liner 80 at longitudinally spaced locations along the length of the liner 80 for accommodating longitudinal thermal expansion of the liner by bellows-like elastic deformation.

In addition, the corrugations 86 may function as rigidifying stiffeners across the transverse cross section of the liner 80. This helps the liner 80 to resist bending forces resulting from liner weight loads and from gas pressure differential loads (such pressure differential loads resulting in flue gas discharge duct systems from the suction effect of the flowing gases).

The corrugations 86 may be conveniently fabricated in the liner 80 by constructing the liner 80 over suitable forms or molds defining the shape of the corrugations 86. Specifically, as best illustrated in FIG. 2, such forms may comprise strips of additional layers of the spacer material 40 (two such additional layers being designated by reference numerals 40A and 40B in FIG. 2).

The layers 40A and 40B can be cut as 10 cm. wide strips from a large panel of the 5 cm. thick spacer material and the strips can be held in place by adhesive or other means (not illustrated). Each corrugation 86 may have a cross section as shown in FIG. 2 with three sides or walls of generally equal length (e.g., 10 cm.) enclosing a substantially square-shaped area. Such a corrugation 86 may be characterized as having a depth to width ratio of 1 to 4. Depending upon other design requirements, the corrugations may have other cross section shapes, such as rectangular or trapezoidal.

Each corrugation 86 can flex or compress inwardly in the longitudinal direction of the length of the duct assembly 10 when the liner 80 expands longitudinally because the corrugation forming layers 40A and 40B of the spacer material within the corrugation 86 are compressible and offer relatively low resistance to flexure of the corrugation 86. In a duct assembly 10 where the height and width of the duct assembly may each range from about 2 meters to about 6 meters, corrugations 86 having a height of about 10 cm. and a width of about 10 cm. may have a longitudinal spacing of between about 62 cm. and about 91 cm.

If the liner 80 is fabricated from fiberglass reinforced polyester, it should, of course, be permitted to properly cure. Then, after the liner 80 has been completely fabricated and it is ready to function as intended, the liner 80 provides a gas-tight inner structure which can move independently of the outer support duct 18 as may be necessary owing to the different coefficients of thermal expansion of the liner 80 and of the outer support duct 18.

Specifically, if the liner 80 has a greater coefficient of thermal expansion than the outer support duct 18 (as would be the case where the outer support duct 18 is steel plate and where the liner 80 is fiberglass reinforced polyester), then the outward (transverse) expansion of the liner would compress the "soft" spacer material 40 in directions generally normal to the inner surface 20 of the outer support duct 18.

In the longitudinal and circumferential directions, the spacer material 40 will likewise not present any significant restraint to the expansion of the liner 80. This is so because the spacer material can be "stretched" parallel to the inner surface 42 even though the spacer material 40 may be bonded on one side to the outer support duct 18 and on the other side to the liner 80.

The spacer material 40 need not elastically "stretch" to accommodate this parallel movement. Indeed, some amount of delamination, tearing, or shearing slippage in the interior of the spacer material 40 can be tolerated as another or additional mechanism which will facilitate relative movement between the spacer material inner surface 42 and the outer surface 44 that is adhesively secured to the duct 18.

If the liner 80 is fabricated as discussed above with fiberglass reinforced polyester to a thickness of between about 5 mm. and about 8 mm. or more, the liner per se has sufficient thickness and rigidity to self-maintain the liner transverse configuration in general conformity with the duct 18 and spacer material inner surface 42. Thereafter, while operating to carry the heated gases, the liner 80 may become completely unbonded or delaminated from the spacer material 40 as a result of many cycles of thermal expansion and contraction. However, this will not present any problems, and in fact, will reduce even further the resistance that the spacer material 40 might impose upon the liner's thermal expansion in the directions parallel to the inner surface 20 of the outer support duct 18.

In some duct systems, internal cross member bracing may also extend from one side of the outer support duct 18 to the other side. With the novel liner design of the present invention, such cross members would necessarily extend through the liner 80 and spacer material 40. In addition, in a typical duct system, the duct has lateral and vertical turns or bends which can create end point restraints of the liner. These restraints would prevent free longitudinal thermal expansion of the liner at those points. The length of duct assembly 10 of the present invention is designed to function between such points of liner restraint so as to accommodate the different thermal expansion movements of the liner 80 and of the outer support duct 18 between such restraints.

As briefly noted above, the outer support duct bottom wall 26 may be covered with a spacer material 40' that is less yielding or less compressible in the direction normal to the inner surface 20 of the bottom wall 26. The bottom wall 26 of the outer support duct 18 can be characterized as being a "first portion" of the outer support duct transverse cross-section perimeter. This first portion defines a load bearing region for (1) supporting selected design loads comprising at least part of the weight of the duct assembly and of particulate matter that may settle out of the flue gases and (2) occasionally temporarily supporting other selected design dead and live loads that may be present during initial construction of the duct assembly or during subsequent inspections of the interior of the duct assembly after construction. The remaining perimeter portion of the duct 18 (i.e., side walls 28 and top wall 30) may be defined as the "second portion" of the duct transverse cross-section perimeter.

It is desirable to install the less compressible load bearing portion of the spacer material 40' in the duct first portion load bearing region. This spacer material 40' can withstand the design loads that act on the inner surface 42 of the spacer material 40' through the liner 80 in directions normal to the inner surface 20 of the support duct 18. This will accommodate such loads without excessive deformation of, and resulting damage to, the overlying liner 80. Thus, men will be able to walk on the liner and place equipment on the liner during and after construction of the duct assembly 10. It will also enable the liner 80 to carry, without substantial deflection, the weight of the particulate matter settling out of the gas onto the bottom of the duct assembly. If the spacer material were very easily compressed in this load bearing region, then the various loads acting downwardly on the liner 80 over the duct bottom wall 26 could deform, bend, or puncture the liner 80 as the spacer material became excessively compressed under such loading.

The use of a spacer material 40' having a relatively less compressible characteristic in the direction normal to the adjacent inner surface 20 of the outer support duct 18 is best illustrated schematically in FIGS. 3 and 4. For purposes of illustrating subsequent thermal expansion of the liner 80, the liner 80 is shown in FIG. 3 as being initially centered about an axis O in the outer support duct 18.

The spacer material 40 is represented by relaxed compression springs A at the two vertical sides of the duct assembly and at the top of the duct assembly. However, the spacer material 40' covering the bottom wall of the duct is represented by a rigid member B which cannot undergo any substantial compression.

In the initial "cold" orientation, before hot gases are passed through the duct assembly, the liner 80 is spaced from the bottom of the outer duct 18 by a distance X, from the top of the outer duct by a distance X, and from either vertical side of the outer duct by a distance X. Since the spacer material 40' represented by the member B has a relatively high resistance to yielding or compression under the application of a downwardly directed force, the liner 80 can support various additional loads during construction of the duct assembly.

When the heated gases are passed through the duct assembly, the liner 80 may expand thermally as illustrated in FIG. 4. Specifically, the liner 80 expands transversely and the perimeter of the liner thus becomes enlarged. This transverse component of the thermal expansion is easily accommodated by the spacer material 40 on the two vertical sides of the duct assembly and at the top of the duct assembly as represented by the compressed springs A. The spacer material 40 in these regions is selected to easily yield or compress in the directions normal to the interior surface 20 of the outer support duct 18.

As illustrated in FIG. 4, the liner 80 expands a distance Z toward the left side of the outer support duct 18 and a distance Z towards a right side of the outer support duct 18. Although the duct 80 would also tend to expand downwardly a distance Z toward the bottom of the outer support duct 18, such thermal expansion is resisted by the spacer material 40' represented by the rigid member B which effectively acts as a restraint in the downward direction and prevents any significant downward thermal expansion of the liner 80. Consequently, the vertical component of the liner expansion must be taken at the top of the duct assembly where such movement is indicated as having a quantitative value of 2Z. This total vertical expansion movement is easily accommodated by the spacer material at the top of the duct assembly owing to the very compressible or yielding nature of the spacer material at that location in the direction normal to the duct inner surface.

It is to be realized that FIGS. 3 and 4 schematically represent only the transverse component of the thermal expansion of the liner 80. At the same time, the liner 80 is also expanding in directions parallel to the inner surface 20 of the outer support duct 18. This expansion occurs circumferentially and longitudinally. Such expansion movement parallel to the outer duct inner surface 20 is easily accommodated by the yielding nature of the spacer material 40 and 40'. To this end, the spacer material 40' at the bottom of the duct assembly represented by the "rigid" member B must be yielding in directions parallel to the outer support duct inner surface 20 even though the material 40' may be less yielding in the normal directions.

Spacer Material Characteristics

The preceding discussion has described how the spacer material 40 functions in the present invention to permit relative movement between the liner 80 and the outer support duct 18 when thermal expansion or contraction occurs (in either the liner or in the outer support duct or in both). If the relative thermal movements were significantly restrained by opposing shear or normal forces, significant shear and compression stresses could be generated in the liner and these could have a deleterious effect on the integrity of the liner 80.

If the spacer material 40 is adhesively or otherwise secured on one side to the outer support duct 18 and on the other side to the liner 80, then such securement should not be permitted to significantly restrain or resist such movement. Even if the spacer material is not secured to the duct and liner, then the forces acting through the frictional engagement of the spacer material with the outer support duct 18 and with the liner 80 should be kept relatively low.

The capability of the spacer material for accommodating the relative thermal movement should thus exist for relatively low levels of the forces generated by the movement of the liner or outer duct against the spacer material (parallel or normal thereto). Then the associated stresses on the liner will be low and will not adversely affect the integrity of the liner.

The spacer material 40 (and 40') used in the present invention has at least two basic properties or characteristics. First, in general terms, it is relatively yielding in directions generally parallel to the inner surface 20 of the outer support duct 18 under the application of relatively low shear forces resulting from relative thermal expansion movement between the liner and the outer support duct in directions generally parallel to the support duct inner surface 20. This will minimize resistance to such relative parallel movement. Liner membrane stress will thus be minimized.

In terms of the illustrated first embodiment of the duct assembly 10, the spacer material 40 (and 40') can be alternatively characterized as having at least its inner surface 42 movable generally parallel to the inner surface 20 of the outer support duct 18 under the application of relatively low shear forces imposed on the inner surface 42 of the spacer material 40 in directions parallel to the support duct inner surface 20 at any location on the inner perimeter of the spacer material 40.

Second, the part of the spacer material 40 that covers at least a portion (but not necessarily all) of the interior transverse cross section perimeter of the outer support duct 18 must also be relatively yielding in directions generally normal to the inner surface 20 of the outer support duct 18 under the application of relatively low forces resulting from relative transverse thermal expansion movement between the liner 80 and the outer support duct 18 in directions generally normal to the support duct inner surface 20. This will minimize resistance to such relative transverse movement. Liner compressive stresses will thus be minimized. (As explained above, the spacer material 40' on the bottom wall of the duct assembly 10 need not necessarily be yielding in directions generally normal to the outer support duct inner surface 20.)

The part of spacer material 40 that is yielding in directions generally normal to the outer support duct inner surface 20 can also be characterized in an alternative manner. It can be regarded as being compressible or movable generally normal to the outer support duct inner surface 20 under the application of relatively low compression forces imposed on the inner or outer surface of the spacer material in directions normal to the support duct inner surface 20.

The term "yielding" has been used to describe the characteristic of the spacer material with respect to certain directionally applied forces. The term should not be construed to necessarily require an inherent resiliency in the material. Indeed, resiliency necessarily implies some amount of resistance to load and a resulting reaction force. To the extent that the selected spacer material exhibits resiliency, the amount of resilient reaction or "spring" force should be sufficiently low to permit the relative thermal movements to occur as discussed above without unacceptably high stresses being generated in the liner or outer support duct. (Of course, the spacer material on the bottom of the duct may advantageously offer relatively high resistance to downwardly directed loads so long as the material offers relatively low resistance to liner or duct movement in directions parallel to the duct inner surface.)

Second Embodiment

Figure 6:
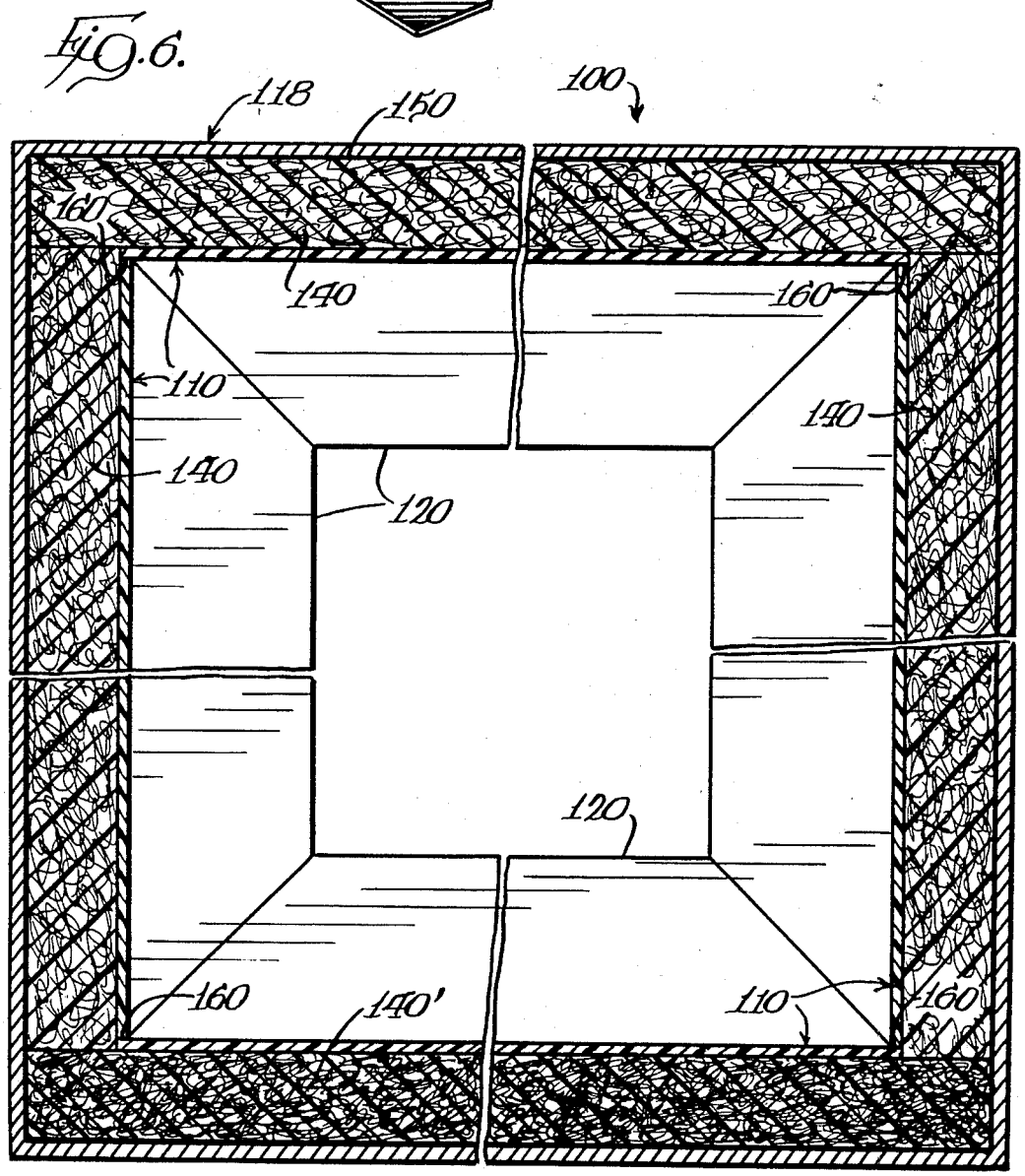
FIG. 6 is a transverse cross-sectional view of the second embodiment of the inner structure in a duct assembly which incorporates the panel illustrated in FIG. 5.

FIG. 6 illustrates a second embodiment of the duct assembly inner structure of the present invention wherein the duct assembly is designated generally by a reference number 100. The duct assembly 100 is designed to accommodate substantial off site or factory prefabrication of the duct assembly liner.

Specifically, the liner comprises a plurality of generally rigid panels, such as panels 110 illustrated in FIG. 5. Each panel 110 may be fabricated from a fiberglass reinforced polyester material to a desired thickness. In one preferred form, the panel thickness is between about 5 mm. and about 8 mm. Each panel 110 may also be prefabricated with a plurality of corrugations or corrugation means 120 extending generally transversely of the liner panel at longitudinally spaced locations for accommodating longitudinal thermal expansion of the liner panel by bellows-like elastic deformation. If necessary, the corrugations 120 may also function as rigidifying stiffeners of the transverse cross-section of the liner so as to resist bending forces resulting from weight loads and from gas pressure differential loads.

The liner panels 110 are designed to be disposed within an outer support duct 118 and spaced from the inner surface of the outer support duct 118 by a yielding spacer material 140 as best illustrated in FIG. 6. The spacer material 140 of the second embodiment may be adhesively secured with pressure sensitive adhesive 150 to the inner surface of the outer support duct 118. Also, as in the first embodiment of the duct assembly, the second embodiment 100 may include a different spacer material 140' in the bottom load bearing region of the duct assembly. The material 140' has substantially more resistance to compression generally normal to the inner surface of the outer support duct 118 then does the spacer material 140 covering the remaining or second portion of the outer support duct on the sides and top of the outer support duct.

When the liner is assembled from prefabricated panels 110 as illustrated in FIG. 6, the liner may be conveniently made self-supporting by providing marginal lips 160 on either side of the bottom and top panels 110 at the duct assembly bottom and top, respectively. The vertical panels 110 on either side wall of the duct assembly can be fitted between these lips 160. Thus, the bottom panel 110 at the bottom of the duct assembly supports the vertical panels 110 on either side wall of the duct assembly and the vertical panels 110 on the sides of the duct assembly support the top panel 110 at the top of the duct assembly.

The ends of the corrugations 120 may be mitered as illustrated in FIGS. 5 and 6 to accommodate a miter engagement at each corner of the duct assembly 100. To provide a leak-tight liner structure, suitable conventional cold joint seals are made between adjacent panels 110.

Modifications of Certain Features

In both the first and second embodiments of the duct assembly described above, the spacer material (40 or 140) is preferably adhesively secured to the inner surface of the outer support duct. This is done primarily to assist in construction of the duct assembly while the liner is properly formed or assembled in the outer support duct. However, other means for holding the spacer material in place may be employed provided that such other means do not impose substantial resistance to relative movements that may occur between the outer support duct and the liner.

One alternate means (not illustrated) for holding the spacer material in place on the outer duct contemplates the use of relatively thin, and easily deformable, studs that are welded endwise to the inside surface of the outer support duct. The spacer material would then be compressed against, and impaled on, the studs. Suitable spring clip speed nuts or similar fasteners could be applied over the ends of the studs to hold the compressible spacer material in place.

Subsequent application of the liner to the inner surface of the spacer material would necessarily bring the liner into contact with the projecting distal ends of the studs and/or portions of the retaining clips. This engagement between the liner and the studs and clips would add some amount of resistance to movement of the liner relative to the outer support duct. However, with a sufficiently thick liner, and with relatively thin and yielding studs, the resistance to thermal expansion of the liner would be insignificant. As the liner expanded thermally, movement of the liner would bend or otherwise deform the studs and retaining fasteners. Of course, to the extent that the spacer material is also either frictionally engaged or actually bonded to the liner, the spacer material also must be sufficiently yielding to minimize any resistance to the thermal expansion of the liner.

As explained above for large duct assemblies having horizontal runs, it is preferred to install on the horizontal bottom wall of the duct assembly a spacer material that is substantially less compressible or less yielding in the direction normal to the outer duct inner surface than is the spacer material on the sides and top of the duct assembly. However, it is not necessary that such a construction be provided in order for the duct assembly to function properly in accordance with the broad principles of the present invention.

This is especially true in vertical riser sections of a duct assembly wherein there is no horizontal load bearing region that will be subjected to substantial weight loads (e.g., fly ash or workers) normal to the inside surface of the outer support duct. In such a section of duct assembly, the spacer material on all sides of the duct assembly may then be uniformly yielding in the direction normal to the duct inner surface.

Third Embodiment

Figure 7:
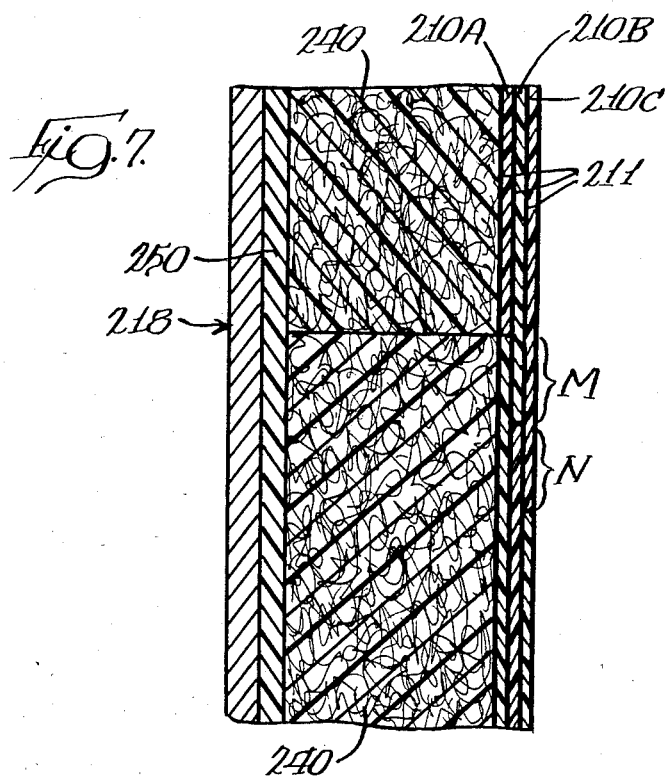
FIG. 7 is a greatly enlarged, fragmentary, cross-sectional view of a side of a third embodiment of the inner structure of the duct assembly.

FIG. 7 illustrates a third embodiment of the duct assembly liner structure of the present invention installed in an outer support duct 218. The duct assembly liner structure is designed to accommodate substantial off site (e.g., factory) prefabrication of the duct assembly liner.

Specifically, liner members 210A, 210B, and 210C are fabricated and assembled off site with a sheet of yielding spacer material 240 to form a composite panel. A plurality of such panels are then installed in the outer support duct 218. In a preferred form of the invention, each member 210A, B, and C is preferably shop fabricated as a laminate of at least one layer of conventional fiberglass mat and at least one layer of conventional fiberglass woven roving fabric. These two layers (not individually distinguishable in FIG. 7) are then bonded together, as with a layer of polyester resin, to form one of the members 210A, 210B, or 210C.

The bonding together of the mat and woven fabric into a member 210A, B, or C may be effected on a suitable mold or form to provide the member with a shape that will conform to a selected portion of the duct interior configuration and to provide the member with one or more corrugations (not illustrated, but similar to the corrugations 86 that are described above with reference to the first embodiment illustrated in FIGS. 1-4). The resulting laminate member typically has a thickness ranging between about 1.59 mm. and 3.18 mm. Not every member need be provided with corrugations—depending on the size of the member and its ultimate location in the outer support duct.

The members 210A, B, and C are preferably bonded together in a layered array or stack with a suitable agent 211 (e.g., a polyester resin) in an offset or staggered orientation as illustrated in FIG. 7. This accommodates the subsequent on site interfitting placement of the bonded members 210A, B, and C in the outer support duct 218 adjacent a similarly bonded set of members so as to create offset interfaces between the adjacent members of each layer. Thus, each member 210B will overlap a portion of an adjacent member 210A and each member 210C will overlap a portion of an adjacent member 210B. The overlapping regions, designated in FIG. 7 by reference letter M and reference letter N, are bonded in the field with a suitable bonding compound, such as polyester resin.

The spacer material 240 is preferably adhered, with polyester resin or some other suitable compound 211, to the surface of the first member 210A during off site fabrication of the members 210A, B, and C. The spacer material 240 may be identical to the spacer material 40 described above with reference to the first embodiment illustrated in FIGS. 1-4. As with the first embodiment, the type of the spacer material 240 used in the outer support duct load bearing region (e.g., bottom) preferably has substantially more resistance to compression generally normal to the inner surface of the outer support duct than does the type of spacer material covering the remaining regions of the outer support duct (e.g., on the sides and top of the outer support duct).

After fabrication of the composite panels which each comprise the three bonded together members 210A, B, and C with the adhered spacer material 240, the composite panels are delivered to the site for installation in the outer support duct 218. The spacer material 240 may be adhesively secured with pressure sensitive adhesive 250 to the inner surface of the outer support duct 218. (The adhesive 250 may be the same as the adhesive 50 used for the first embodiment described above with reference to FIGS. 1–4.)

Temporary stiff leg bracing may be used to initially aid in placing and holding the composite panels on the interior of the outer support duct 218. The composite panels are bonded together, as with polyester resin 211, at the overlapped joint regions M and N. After these joint regions have cured, the entire assembly is self-supporting. Also, lips may be provided on the margins of the horizontally disposed members 210A, B, and C along the sides of the duct assembly for accommodating the vertically disposed members 210A, B, and C at the side walls in a manner analogous to that described above in detail for the panels 110 of second embodiment illustrated in FIGS. 5 and 6.

Fourth Embodiment

Figure 8:
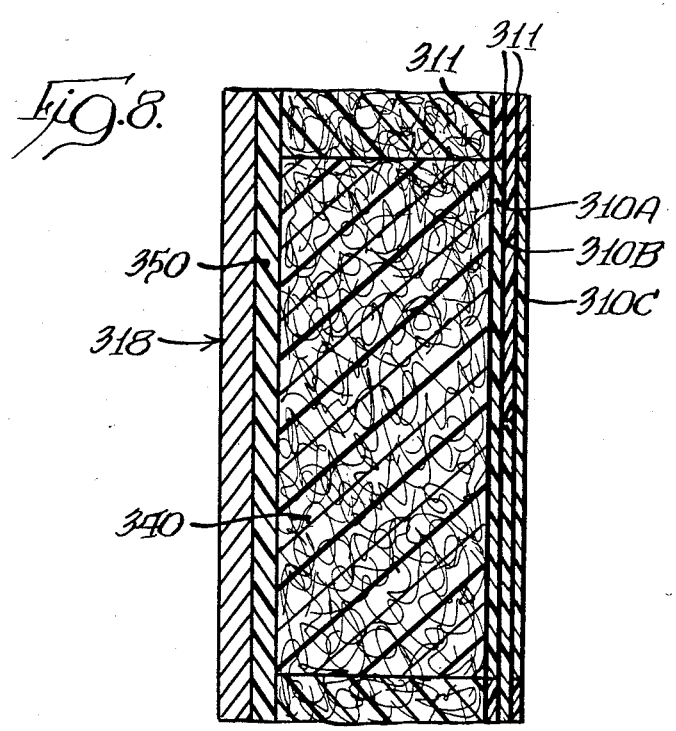
FIG. 8 is a greatly enlarged, fragmentary, cross-sectional view of a side of a fourth embodiment of the inner structure of the duct assembly.

FIG. 8 illustrates a fourth embodiment of the duct assembly inner structure of the present invention installed in an outer support duct 318. This embodiment is also designed to accommodate substantial off site or factory prefabrication of the duct assembly liner.

Specifically, the liner includes a plurality of liner members 310A, 310B, and 310C. As in the third embodiment described above, each liner member may be fabricated from a fiberglass mat layer that is suitably bonded, as with polyester resin, to a fiberglass woven roving fabric layer to form a laminate member with a typical thickness ranging between about 1.59 mm. and about 3.18 mm. However, unlike in the third embodiment described above, the members 310A, B, and C in this fourth embodiment are not bonded together off site to form a composite panel. Rather, after fabrication, the individual members 310A, B, and C are shipped in an unbonded condition to the site. However, selected members (which are intended to be used as the innermost layer members 310A) each have a sheet of spacer material 340 bonded to them at the factory. This may be effected with a polyester resin 311A or some other suitable bonding agent.

The spacer material 340 has the same characteristics as the spacer material 40 described above with reference to the first embodiment illustrated in FIGS. 1–4. Additionally, portions of the spacer material 340 may have substantially more resistance to compression generally normal to the inner surface of the outer support duct 318 for the reasons given above in describing the more compression resistant spacer material 40' of the first embodiment illustrated FIGS. 1–4.

At the site, the liner is assembled inside the outer support duct 318 as illustrated in FIG. 8. Installation of the inner liner structure involves the following steps. First, the inner surface of the duct 318 is coated with a suitable adhesive 350. The adhesive 350 may be the same as the adhesive 50 described above with reference to the first embodiment illustrated in FIGS. 1–4. Then, each innermost member 310A, with the spacer material 340 bonded thereto, is placed against the adhesive 350 on the inner surface of the outer support duct 318 and is adhered thereto.

Next, the second layer of members 310B is applied by bonding each member 310B to the already installed members 310A. Preferably, the second layer of members 310B is bonded with a polyester resin 311 and each member 310B is offset relative to the first layer of members 310A so as to stagger the end margins of the members in the second layer relative to the end margins of the members in first or innermost layer.

Finally, the outermost layer of members 310C is installed. Each member 310C may be bonded with a polyester resin 311 to the underlying layer of members 310B. The members 310C are also staggered relative to the underlying row of members 310B so that the end margins of the members 310C are offset from the end margins of the members 310B in the underlying row. Suitable stiff leg supports may be used during installation of the members in the outer support duct 318 until the polyester resin 311 has cured.

Although three layers of members are illustrated as forming the liner in the third and fourth embodiments illustated in FIGS. 7 and 8, respectively, it is to be realized that more or less layers of members may be employed. Additionally, each member may be fabricated from other suitable materials. Depending upon the strength of such other materials, each member need not necessarily be formed as a laminate structure. With a suitably strong material, each member may have a homogeneous construction.

From the foregoing, it will be observed that numerous variations and modifications may be effected without departing from the true spirit and scope of the novel concepts of the invention. It is to be understood that no limitation with respect to the specific structures and methods illustrated herein is intended or should be inferred. It is, of course, intended to cover by the appended claims, all such modifications as fall within the scope of the claims.

What is claimed is:

1. In an outer support duct subject to corrosion from heated corrosive gases and condensate which may form, the improvement comprising a length of longitudinally extending inner structure designed to operate at, and accommodate, the gas temperatures while eliminating or minimizing the gas corrosion of the outer support duct interior, said inner structure including:

a substantially gas-tight liner disposed within the interior of said outer support duct, said liner having sufficient thickness and rigidity to self-maintain the liner transverse configuration in general conformity with the transverse configuration of said outer support duct and with the liner being spaced from said outer support duct, said liner being fabricated from a material substantially resistant to said corrosive gases and condensate, said liner defining a plurality of corrugation means extending generally transversely of said liner at longitudinally spaced locations along the length of the liner for accommodating longitudinal thermal expansion of the liner by bellows-like elastic deformation and for functioning as rigidifying stiffeners of the transverse cross section of the liner; and a spacer material disposed between said outer support duct and said liner, said spacer material having an inner surface and an outer surface with the spacer material outer surface substantially covering the inner surface of said outer support duct, at least said inner surface of said spacer material being movable generally parallel to the inner surface of said outer support duct under the application of relatively low shear forces imposed on the inner surface of the spacer material in directions parallel to the inner surface of said outer support duct to thereby minimize resistance to the thermal expansion of said liner in directions parallel to said outer support duct inner surface, at least a portion of said spacer material that covers a portion of the interior transverse cross section perimeter of said outer support duct also being movable generally normal to the inner surface of said outer support duct under the application of relatively low compression forces imposed on the inner surface of the spacer material by the liner in directions normal to the inner surface of said outer support duct to thereby minimize resistance to the thermal expansion of said liner transversely of said duct.

2. In an outer support duct for heated corrosive gases, the improvement comprising an inner structure including:
   a substantially gas-tight liner that is (1) substantially resistant to said corrosive gases and condensate which may form, (2) disposed in the interior of said outer support duct, (3) spaced from said outer support duct but is otherwise in general conformity with the transverse configuration of said outer support duct, and (4) provided with a plurality of corrugation means extending generally transversely of said liner at longitudinally spaced locations along the length of the liner for accommodating longitudinal thermal expansion of the liner by bellows-like elastic deformation; and
   a spacer material disposed between said outer support duct and said liner, said spacer material substantially covering the inner surface of said outer support duct, said spacer material being relatively yielding in directions generally parallel to the inner surface of said outer support duct, at least a portion of said spacer material that covers a portion of the interior transverse cross section perimeter of said outer support duct also being relatively yielding in directions generally normal to the inner surface of said outer support duct.

3. The inner structure in accordance with claim 2
   in which said spacer material has an inner surface and an outer surface with the outer surface facing the outer support duct inner surface;
   in which said spacer material outer surface is adhesively secured to said outer support duct inner surface;
   in which said liner is bonded to said spacer material inner surface; and
   in which said spacer material comprises panels of a sufficiently yielding construction to permit said spacer material inner surface to be moved relative to said spacer material outer surface under the influence of relatively low shear forces in directions generally parallel to said outer support duct inner surface.

4. The inner structure in accordance with claim 3 in which said spacer material has the characteristic of tearing or delaminating when shear forces are applied to said spacer material in directions parallel to said outer support duct inner surface whereby such tearing or delaminating accommodates relative movement between said spacer material inner surface and said spacer material outer surface.

5. The inner structure in accordance with claim 2 in which said liner comprises a plurality of members bonded together in layers and in which said spacer material is bonded to the members forming one of said layers of members.

6. The inner structure in accordance with claim 5 in which each member comprises a mat layer of fiberglass bonded to a woven roving layer of fiberglass to form a laminate structure.

* * * * *